United States Patent
Lee et al.

(10) Patent No.: US 9,028,313 B2
(45) Date of Patent: May 12, 2015

(54) METHOD AND APPARATUS FOR MANIPULATING CHARACTER OF SOCCER GAME

(75) Inventors: In Seok Lee, Seoul (KR); Dong Hyun Nam, Gyeonggi-do (KR)

(73) Assignee: Intellectual Discovery Co., Ltd., Seoul (KR)

(*) Notice: Subject to any disclaimer, the term of this patent is extended or adjusted under 35 U.S.C. 154(b) by 0 days.

(21) Appl. No.: 13/988,081

(22) PCT Filed: Mar. 9, 2012

(86) PCT No.: PCT/KR2012/001726
§ 371 (c)(1),
(2), (4) Date: May 17, 2013

(87) PCT Pub. No.: WO2013/100258
PCT Pub. Date: Jul. 4, 2013

(65) Prior Publication Data
US 2014/0302900 A1 Oct. 9, 2014

(30) Foreign Application Priority Data
Dec. 29, 2011 (KR) .................. 10-2011-0145912

(51) Int. Cl.
*A63F 13/10* (2006.01)
*A63F 13/00* (2014.01)
*A63F 13/40* (2014.01)

(52) U.S. Cl.
CPC .............. *A63F 13/005* (2013.01); *A63F 13/10* (2013.01); *A63F 2300/8011* (2013.01)

(58) Field of Classification Search
USPC ............................................... 463/4
See application file for complete search history.

(56) References Cited

U.S. PATENT DOCUMENTS

| 6,280,323 B1 | 8/2001 | Yamazaki et al. |
| 6,676,518 B1 | 1/2004 | Sawa et al. |
| 7,887,402 B2 | 2/2011 | Suzuki et al. |
| 8,393,961 B2* | 3/2013 | Suzuki et al. .................. 463/31 |
| 2008/0132334 A1* | 6/2008 | Nonaka et al. ................ 463/37 |
| 2010/0304857 A1* | 12/2010 | Suzuki et al. .................. 463/31 |

FOREIGN PATENT DOCUMENTS

KR 2008-0050561 A 6/2008

OTHER PUBLICATIONS

International Search Report issued for PCT application No. PCT/KR2012/001726 dated Nov. 28, 2012.

* cited by examiner

*Primary Examiner* — Pierre E Elisca
(74) *Attorney, Agent, or Firm* — Rothwell, Figg, Ernst & Manbeck, P.C.

(57) ABSTRACT

A method for manipulating a character of a soccer game includes, by an apparatus for manipulating the character of the soccer game, receiving information on a current position of a cursor in a game, the cursor being moved to correspond to movement of an input means on a soccer game screen, and information on a position of the game character controlled by a user via a user terminal that displays the game screen, calculating a direction of a vector that is formed to extend from the position of the game character to the position of the displayed cursor and a magnitude of the vector according to a distance between the position of the game character and the position of the cursor, and controlling the game character so as to be moved in the direction of the vector at a speed corresponding to the magnitude of the vector.

20 Claims, 16 Drawing Sheets

| MAGNITUDE OF VECTOR (CHANGED FROM DISTANCE ON GAME SCREEN TO DISTANCE ON REAL STADIUM (SCALE: m)) | MOVEMNET TYPE |
|---|---|
| ~ 0.6 | STOP |
| 0.6 ~ 2 | WALKING |
| 2 ~ 20 | RUNNING |
| 20 ~ | SPRINT |

| OFFENSE | |
|---|---|
| SELECTION BUTTON | ACTION |
| M1 | SHOOT |
| M2( ~ 0.5sec) | SHORT PASS |
| M2(0.5sec~) | LONG PASS |

| DEFENSE | |
|---|---|
| SELECTION BUTTON | ACTION |
| M1 | SLIDING TACKLE |
| M2 | SHOULDER FIGHT |
| M3 | CHARACTER SELECTION |

METHOD AND APPARATUS FOR MANIPULATING CHARACTER OF SOCCER GAME

CROSS REFERENCE TO RELATED APPLICATIONS AND CLAIM OF PRIORITY

This patent application is a National Phase application under 35 U.S.C. §371 of International Application No. PCT/KR2012/001726, filed Mar. 9, 2012, which claims priority to Korean Patent Application No. 10-2011-0145912 filed Dec. 29, 2011, entire contents of which are incorporated herein by reference.

TECHNICAL FIELD

The present invention relates to technologies for manipulation of a game character corresponding to a soccer player in a game screen with regard to a soccer game that embodies a soccer, of all sports, into game content so as to allow a user to play a game by controlling a soccer player character, and more particularly to interface provision technologies capable of manipulating a character of a soccer game using a simple input means.

BACKGROUND ART

In recent years, a variety of game content has been developed and made available to a user owing to advances in hardware and programming technologies. In particular, a sports game is game content of sporting events that the user can actually perform, and has recently gained great popularity because it gives the user the sensation of participating in a real world sports game.

One example of such a sports game that allows the user to perform a desired action by effectively manipulating a game character is a soccer game. In the case of a soccer game, the user may constitute a team using eleven field players and manipulate a game character corresponding to each player. The aim of the soccer game is to win a match by kicking a ball into the back of a net of an opponent and by blocking an offensive play of the opponent.

To accomplish the aim of the soccer game, when executing the game, the user must accurately manipulate and control a game character such that the game character accurately passes a ball to another character of his side, kicks the ball into the back of a net of an opponent, and takes the ball from the opponent or steals the ball that the opponent kicks as quick as possible when the opponent owns the ball.

In general, manipulation of the character in the soccer game is accomplished using an input device, such as, for example, a keyboard or a joystick. However, technologies have been continuously developed, which may provide the user with a novel form of entertainment by allowing the user to manipulate the game character using a variety of input means, and may provide ease in manipulation of the game character via simple input.

SUMMARY

Therefore, it is an object of the present invention to provide a user with character manipulation technologies via a novel input means, the technologies being capable of assisting the user in achieving a novel form of entertainment by manipulating a character of a soccer game, and of arousing interest in the game.

In accordance with one aspect of the present invention, the above and other objects can be accomplished by the provision of a method for manipulating a character of a soccer game, the method including, by an apparatus for manipulating the character of the soccer game, receiving information on a current position of a cursor in a game, the cursor being moved to correspond to movement of an input means on a soccer game screen, as well as information on a position of the game character that is controlled by a user via a user terminal that displays the game screen, calculating a direction of a vector that is formed to extend from the position of the game character to the position of the displayed cursor and a magnitude of the vector according to a distance between the position of the game character and the position of the cursor, and controlling the game character so as to be moved in the direction of the vector at a speed corresponding to the magnitude of the vector.

The control of the game character may include judging whether the distance between the position of the game character and the position of the cursor corresponding to the magnitude of the vector belongs to any one section among a preset number of distance sections, and controlling the game character so as to be moved at different speeds on a per distance section basis.

The control of the game character may include controlling the game character so as to stop movement thereof if the distance is less than a first preset critical distance, controlling the game character so as to be moved at a first preset speed if the distance is within a range from the first critical distance and a second preset critical distance, controlling the game character so as to be moved at a second preset speed if the distance is within a range from the second critical distance and a third preset critical distance, and controlling the game character so as to be moved at a third preset speed if the distance is equal to or greater than the third critical distance.

The first speed may be less than the second speed, and the third speed may be less than the second speed.

The control of the game character may include, if input of a preset input button among a plurality of input buttons included in the input means is sensed, controlling the game character so as to be moved at a preset critical speed regardless of the magnitude of the vector while the input is maintained.

In accordance with another aspect of the present invention, there is provided a method for manipulating a character of a soccer game, the method including, by an apparatus for manipulating the character of the soccer game, receiving information on a current position of a cursor in a game, the cursor being moved to correspond to movement of an input means on a soccer game screen, as well as information on a position of the game character that is controlled by a user via a user terminal that displays the game screen, calculating a direction of a vector that is formed to extend from the position of the game character to the position of the displayed cursor, receiving input information regarding at least one input button included in the input means, selecting an action instruction matched to the input button corresponding to the input information among one or more action instructions for control of an action of the game character, and controlling the game character so as to perform an action in the calculated direction of the vector in response to the selected action instruction.

The selection of the action instruction may include, if a user team is performing an offensive play, selecting an action instruction belonging to the offensive play among action instructions matched to the input button corresponding to the input information.

The reception of the input information may include, if a user team is performing an offensive play, receiving information on a given duration for which input with respect to the input button corresponding to the input information is maintained.

The control of the game character may include setting the strength of an action corresponding to the selected action instruction so as to be proportional to the duration, and controlling the game character so as to perform the action in the calculated direction of the vector by the set strength in response to the selected action instruction.

The selection of the action instruction may include, if a user team is performing a defensive play, selecting an action instruction belonging to the defensive play from among action instructions matched to the input button.

The calculation of the direction of the vector may include setting a first preset number of areas by dividing the game screen in a vertical direction of the game screen if the soccer game screen is a screen with regard to any one situation among free kick, corner kick, and goal kick situations, changing at least one of the game screen and a gaze direction of the game character such that the game character views one area where the cursor is located among the first number of areas, and setting any one of the changed game screen and the changed gaze direction of the game character to a direction in which a ball is moved from the game character in any one situation among free kick, corner kick, and goal kick situations.

The control of the game character may include controlling the game character so as to perform an action in the set movement direction of the ball in response to the selected action instruction.

The calculation of the direction of the vector may include dividing an area where an image of a net is displayed into a second preset number of areas in a lattice pattern if a user team is performing an offensive play and the soccer game screen shows a penalty kick situation, and setting one area where the cursor is located among the second number of areas to a destination to which a ball is moved in the penalty kick situation.

The calculation of the direction of the vector may include dividing an area where an image of a net is displayed into a second preset number of areas in a lattice pattern if a user team is performing a defensive play and the soccer game screen shows a penalty kick situation, and setting one area where the cursor is located among the second number of areas to a destination to which a goal keeper character is moved in the penalty kick situation.

In accordance with another aspect of the present invention, there is provided a method for manipulating a character of a soccer game, the method including sensing, by a soccer game server, connection of a user terminal to the soccer game, extracting information regarding an input means selected by a user from user information, the input means being selected from among one or more input means that may be used to manipulate the character of the soccer game, transmitting a tutorial menu to the user terminal if the input means selected by the user is an input means that functions to move a cursor that serves as an indicator means displayed on a game screen, the tutorial menu being a menu for selection of information regarding character manipulation methods using the input means that functions to move the cursor, controlling display of information on a game loading screen of the user terminal upon game loading, the information being information for checking at least one of the character manipulation methods using the input means that functions to move the cursor, and receiving an instruction via an input means preset in the game server during game play, except for an instruction that may be performed via the input means that functions to move the cursor.

The transmission of the tutorial menu may include transmitting action instructions that may be input using the input means that functions to move the cursor after sorting the action instructions into a movement action, an offensive action, a defensive action, and an action on a per game situation basis.

The transmission of the tutorial menu may include transmitting at least one of animation data with regard to implementation of the action instruction using the input means that functions to move the cursor, and character data including text information on an input method of the action instruction.

In accordance with a further aspect of the present invention, there is provided an apparatus for manipulating a character of a soccer game, the apparatus including a position sensing unit that receives information on a current position of a cursor in a game, the cursor being moved to correspond to movement of an input means on a soccer game screen, as well as information on a position of the game character that is controlled by a user via a user terminal that displays the game screen, a vector calculation unit that calculates a direction of a vector that is formed to extend from the position of the game character to the position of the displayed cursor and a magnitude of the vector according to a distance between the position of the game character and the position of the cursor, and a character control unit that controls the game character so as to be moved in the direction of the vector at a speed corresponding to the magnitude of the vector.

The character control unit may judge whether the distance between the position of the game character and the position of the cursor corresponding to the magnitude of the vector belongs to any one section among a preset number of distance sections, and may control the game character so as to be moved at different speeds on a per distance section basis.

The character control unit may control the game character so as to be moved at a greater speed as the distance is increased.

If input of a preset input button among a plurality of input buttons included in the input means is sensed, the character control unit may control the game character so as to be moved at a preset critical speed regardless of the magnitude of the vector while the input is maintained.

The apparatus for manipulating the character of the soccer game may further include an input reception unit that receives input information regarding at least one input button among the plurality of input buttons included in the input means, and an instruction selection unit that selects an action instruction matched to the input button corresponding to the input information among one or more action instructions for control of an action of the game character.

The character control unit may control the game character so as to perform an action in the calculated direction of the vector in response to the selected action instruction.

The instruction selection unit may select different action instructions, respectively belonging to an offensive play and a defensive play, according to whether a user team is performing the offensive play or the defensive play.

The input reception unit may receive information on a given duration, for which input with respect to the input button corresponding to the input information is maintained, if a user team is performing an offensive play.

The character control unit may control the game character so as to perform the action in response to the selected action instruction by a strength that is set so as to be proportional to the duration.

According to the present invention, it is possible to allow a user to simply control a game character using a variety of input means, such as, for example, a mouse, and to give the user manipulation sensation that is almost similar to the sensation of manipulating the game character via a complex key operation using, for example, a keyboard. This may provide the user with a novel form of entertainment via character manipulation, resulting in enhanced interest in a game and increased utilization of the game.

BRIEF DESCRIPTION OF DRAWINGS

FIGS. 9 to 11 are views showing matching examples of an action instruction according to different embodiments of the present invention.

DETAILED DESCRIPTION

Figure 1:
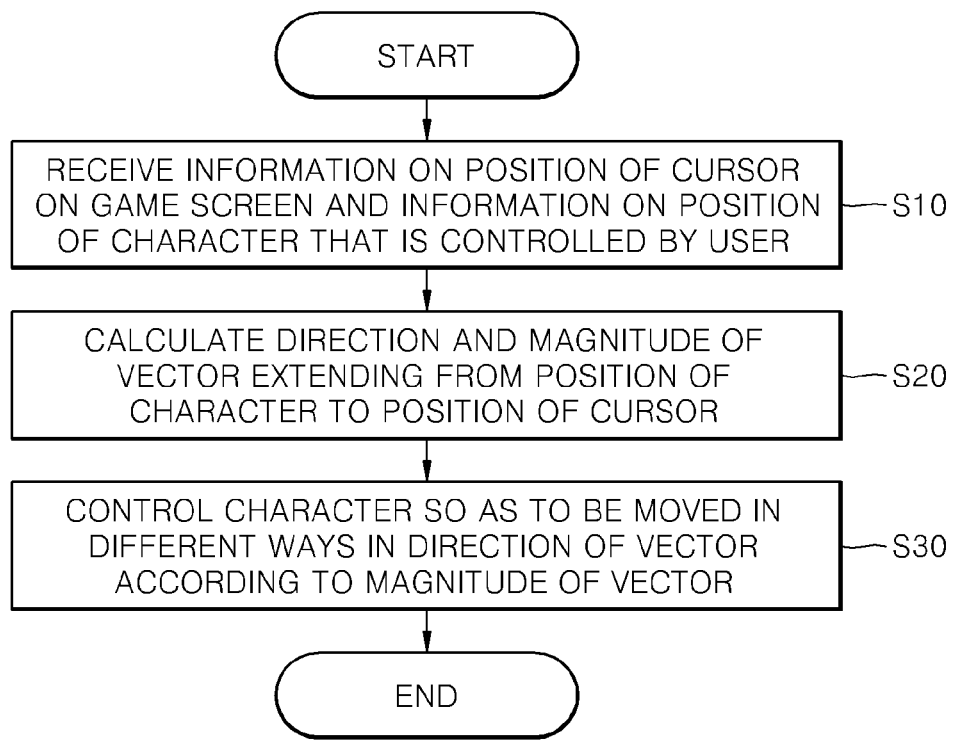
FIG. 1 is a flowchart of a method for manipulating a character of a soccer game according to an embodiment of the present invention.

Hereinafter, an apparatus and method for manipulating a character of a soccer game according to the embodiments of the present invention will be described with reference to the accompanying drawings.

In the following description, a description of known technologies with regard to characteristics of the present invention will be omitted for clear understanding of the present invention. Those skilled in the art will appreciate that the following embodiments are given to aid in understanding of the present invention and there is no intent to limit the technical sprit of the present invention. Accordingly, other equivalent inventions that perform the same functions as those of the present invention will be within the scope of the present invention.

In the following description, the same or similar elements are denoted by the same reference numerals, and an unnecessary repeated description thereof and a description of known technologies will be omitted.

In the embodiments of the present invention, the terms "communication", "communication network", and "network" may be used interchangeably. The three terms refer to as wired/wireless local area and wide area data transmission/reception networks to enable transmission/reception of files between user terminals and between a user terminal and a download server.

In the following description, the term "game server" refers to a server computer that a user accesses to use game content. In the case of a game, the capacity of which is small or the number of users of which is small, a single game server may manage a plurality of game programs. In addition, in the case of a game, the capacity of which is very great or the number of real time access users is great, one or more game servers may be present to manage a single game according to the function of the game.

Additionally, although database middleware or payment processing servers may be connected to a game server, a description thereof will be omitted in the present disclosure.

In the present invention, game content refers to a game program that is downloaded from a game server and stored in a memory of a user terminal to assist the user in enjoying a game by executing the program in the user terminal. Alternatively, the game content may include online content that the user can use when accessing the game server, and the online content provides only real-time data to be stored in and then deleted from the user terminal. The game content may be executed in at least one mode among a "single play" mode in which the user can play against a computer artificial intelligence via the user terminal, and a "multi play" mode in which two or more users can enjoy a game via a network connection.

In the present invention, a game character refers to all characters that appear in an online game that allows the user to virtually experience a soccer game of sports games. The game character is displayed on a game screen and performs an action that is executable in the soccer game according to user manipulation. Moreover, the game character may be raised in level as predetermined experience points are accumulated according to implementation results of the game, and in turn status points of the game character may be increased in proportion to level.

The status points of the game character refer to numerical information included in character information. The character information may contain a plurality of numerical values that represent the status points of the game character, and each numerical value serves as an index representing the characteristics and strength of the character in the game.

For example, in the case of a soccer game, a position of each game character may be changed according to the status points of the game character. That is, a position of a game character having high offensive points may be set to a striker, a position of a game character having high pass and dribble points may be set to a midfielder, a position of a game character having high defensive points may be set to a defender, and a position of a game character having high goal keeping points may be set to a goalkeeper, for example. In other words, the status points of each game character may be differently distributed according to each position. In addition, it will be clearly understood that an outstanding player is higher in terms of each ability absolute value than other players are.

In the present invention, the status points of the game character may include status points with respect to movement, such as, for example, a movement speed, an instantaneous acceleration, and posture balance upon change of a movement direction. In addition, the status points may include the strength and accuracy of a kick, for example, with regard to an offensive play, as well as tackle and defense power, for example, with regard to a defensive play. In general, any other status points representing abilities of a character of a soccer game may be applied to the status points of the game character according to the present invention.

In a sports game, to directly utilize names of countries and respective pro-leagues, for which domestic and foreign athletes play, as well as appearances and real names of the athletes, license contracts between a game service provision enterprise and an international management institution of the corresponding sports game as well as management institutions of each country and each pro-league may be necessary.

In addition, each game character contains plural kinds of information, in order to display a game character on a game screen or to differentiate performances of respective characters for game play. As a representative example, information on the game character may include image information on the game character that assists the user in visually checking the game character in a game standby screen and a game execution screen.

For example, in the case of a soccer game, information on the game character may include 2-dimensional or 3-dimensional image information representing body features of each player who wears designated soccer wear as well as image information depicting the face of the player. In addition, information on the game character may include information that assists a game character corresponding to each player in executing a game, for example, information including the name, body features, country and position of the player.

Additionally, it is possible to characteristically display a figure of the game character on a game screen when the game character moves while performing a dribble, a kick, a pass, a tackle, and an off-the-ball incident. In the present invention, a screen image depicting motion of the game character corresponding to the aforementioned action, other than a stationary image, is referred to as character motion data. The character motion data is acquired by matching intrinsic motion data of domestic and foreign soccer players to respective game characters. Accordingly, the user may view figures similar to real world soccer players by checking the character motion data displayed on a game screen via the characters.

In the present invention, a character of a sports game corresponds to a real world athlete, and therefore status points contained in information on each game character are differently set according to the game history and evaluation of the corresponding real world athlete. The status points of the game character in the present invention refer to numerical information that reflects ability of the real world athlete and determines the performance of each game character corresponding to the athlete in the game.

FIG. 1 is a flowchart of a method for manipulating a character of a soccer game according to an embodiment of the present invention.

Referring to FIG. 1, the method for manipulating a character of a soccer game according to an embodiment of the present invention includes receiving cursor position information and character position information (S10). Here, the cursor position information is information on a currently displayed position of a cursor on a soccer game screen, the cursor being moved according to movement of an input means that serves to move the cursor. In addition, the character position information is information on a displayed position of a game character on a game screen of a user terminal through which the user can control the game character.

In the present invention, although the cursor may be changed according to the kind of the user terminal, the cursor generally refers to an indicator means that is displayed for selection or indication of various menus upon execution of a game or an operating system of a personal computer. A representative example of the cursor according to the present invention includes a mouse cursor that is moved according to movement of a mouse.

Accordingly, a representative example of the input means to move the cursor on the game screen includes a mouse. However, the cursor movement input means of the present invention may include any other input means capable of moving the aforementioned cursor, instead of the mouse.

In Operation S10, the cursor position information that is information on the displayed position of the cursor on the game screen is received, and simultaneously the character position information that is information on the displayed position of the game character that is controlled by the user is received. The character position information refers to information on a real-time displayed position of the game character that is stationary or is being moved. A preset part of an image depicting the game character is set to a position of the game character, and information on the set position is received.

Thereafter, a vector, which extends from the position of the game character to the position of the cursor, is generated, and the direction and magnitude of the vector are calculated (S20). The direction of the vector may be set to a combination of upward, downward, leftward and rightward on the basis of the soccer game screen, i.e. a field for the play of a soccer game. In addition, the magnitude of the vector may be set to the size of pixels of a real screen, and a distance on the game screen may be changed to a distance on a real soccer stadium. For example, assuming that a distance from the position of the game character to the position of the cursor in the game screen is 10 cm, the changed distance on the real soccer stadium may be 20 m, for example. In this case, the magnitude of the vector may be set to 20 m.

After the direction and magnitude of the vector are calculated, a server controls the game character in real time in such a way that the game character is moved in different ways, i.e. moved at different speeds in the direction of the vector according to the magnitude of the vector. In this case, the server, as exemplarily shown in FIG. 2, may control the game character in such a way that the game character is moved at different speeds on a per vector section basis under the assumption that the magnitude of the vector is sorted into a plurality of sections. Alternatively, the server may set a successively varying speed function proportional to the magnitude of the vector, and control the game character so as to be moved at a speed calculated according to the speed function.

It will be clearly understood that Operations S10 to S30 are performed in real time according to movement of the cursor.

Figure 2:
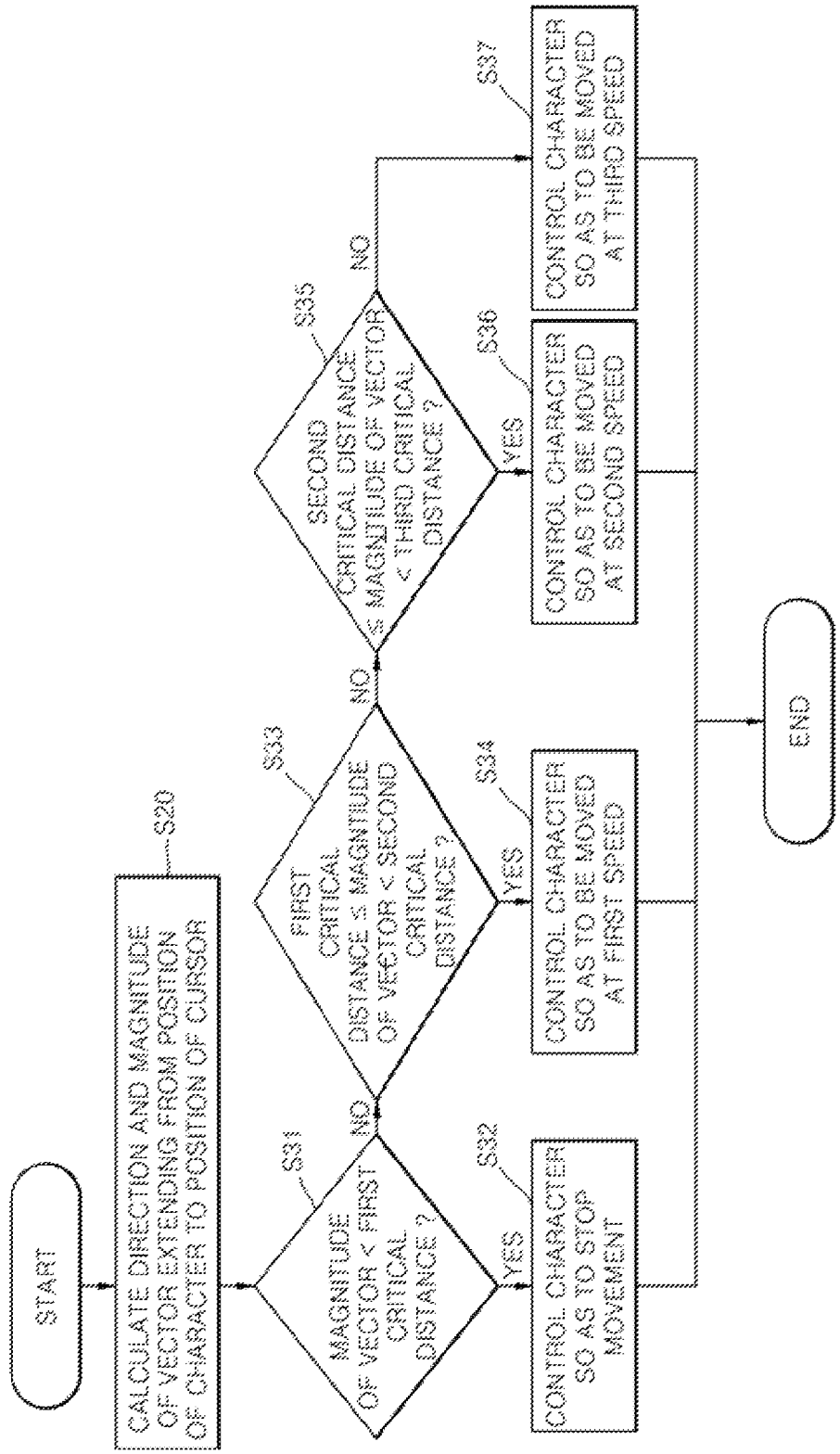
FIG. 2 is a flowchart showing control of movement of a game character based on the magnitude of a vector according to an embodiment of the present invention.

FIG. 2 is a flowchart showing control of movement of a game character based on the magnitude of a vector according to an embodiment of the present invention. In the following description, a repeated part of the above description with regard to of FIG. 1 will be omitted.

Referring to FIG. 2, first, the direction and magnitude of the vector are calculated (S20).

In the embodiment of FIG. 2 according to the present invention, the magnitude of the vector is sorted into a plurality of sections, and boundaries between the sections are referred to as a first critical distance, a second critical distance, and a third critical distance, for example. Although each critical distance may be set to a value changed to a distance on a real field as mentioned above, the critical distance may be set to, for example, a pixel distance or a distance on the game screen according to embodiments.

First, it is judged whether or not the magnitude of the vector is less than the first critical distance (S31). The first critical distance, for example, may be 0.6 m. If it is judged that the magnitude of the vector is less than the first critical distance, the server controls the game character so as to stop movement thereof (S32). That is, if the cursor is located within a radius of the first critical distance about the game character, movement of the game character stops.

If it is judged that the magnitude of the vector is not less than the first critical distance, i.e. if it is judged that the magnitude of the vector is equal to or greater than the first critical distance, the server judges whether or not the magnitude of the vector is less than the second critical distance (S33). If it is judged that the magnitude of the vector is within the aforementioned range, the server controls the game character so as to be moved at a first speed (S34). The first speed, for example, refers to a speed indicating that the game character is walking on the game screen. Meanwhile, in the present invention, a second speed and a third speed, which will be described hereinafter, may be preset and refer to animation scenes depicting movement of the game character, although the second speed and the third speed may be definite movement speeds of the game character.

If it is judged that the magnitude of the vector is not less than the second critical distance, i.e. if it is judged that the magnitude of the vector is equal to or greater than the second critical distance, the server judges whether or not the magnitude of the vector is less than the third critical distance (S35). If the magnitude of the vector is within the aforementioned range, the server controls the game character so as to be moved at a second speed (S36). In addition, if it is judged in Operation S35 that the magnitude of the vector, i.e. a distance between the cursor and the game character is equal to or greater than the third critical distance, the server controls the game character so as to be moved at a third speed (S37).

In the present invention, the second speed is greater than the first speed, and in this case, the game character that is moved at the second speed may be depicted via an animation scene showing that the character is running. In addition, the third speed is greater than the second speed, and in this case the game character that is moved at the third speed may be depicted via an animation scene showing that the character that is sprinting, i.e. is running faster than that at the second speed.

As exemplarily shown in FIG. 2, since the movement speed of the game character and the animation scene depicting a movement motion of the game character may be changed according to the calculated magnitude of the vector that corresponds to the distance between the character and the cursor, it is possible to move the game character in various ways via simplified cursor movement, which enables more comfortable manipulation of the game character.

Figure 3:
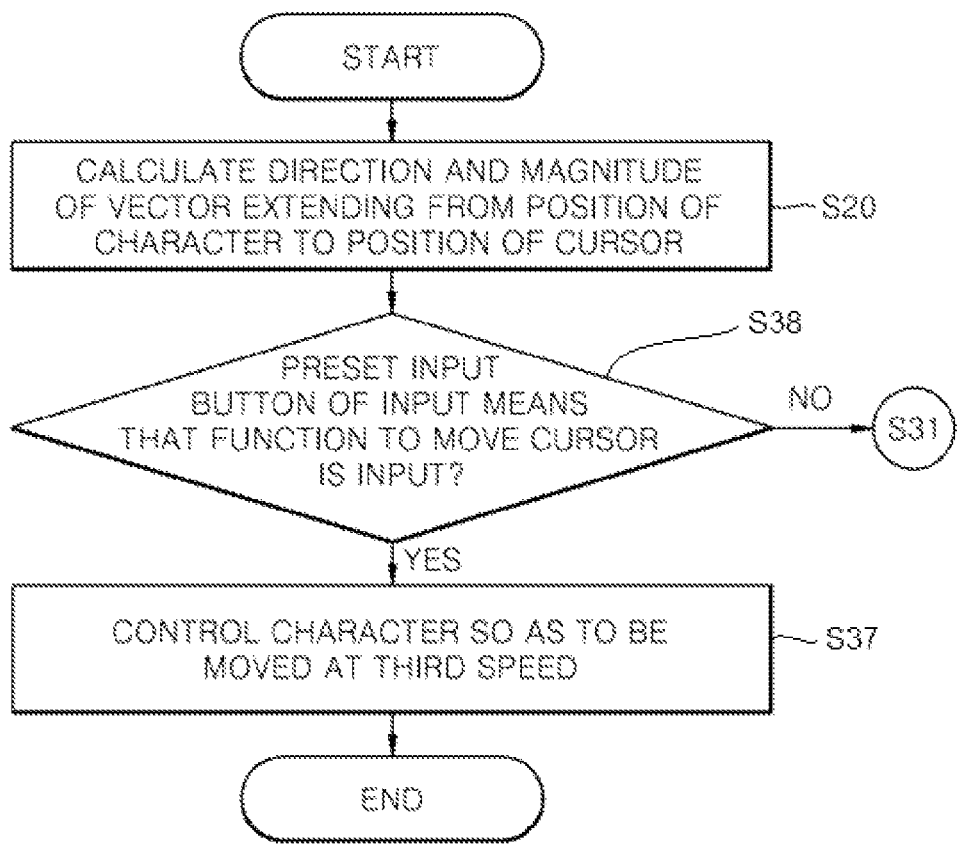
FIG. 3 is a flowchart showing control of movement of a game character according to an embodiment of the present invention.

FIG. 3 is a flowchart showing control of movement of a game character according to an embodiment of the present invention.

It has been found in the embodiment of FIG. 2 that the movement manner and speed of the game character are changed according to the magnitude of the vector. Meanwhile, it may be attempted to move the game character at the highest critical speed, i.e. at the third speed as described in FIG. 2, regardless of the position of the cursor.

To this end, in FIG. 3, first, after calculating the magnitude and direction of the vector (S20), it is judged whether or not input with regard to any one preset input button among a plurality of input buttons included in the input means is sensed (S38). In this case, if no input is sensed, the server returns to Operation S31 in FIG. 2, thereby controlling the movement manner and speed of the game character based on the magnitude of the vector.

On the other hand, if input is sensed, the server controls the game character so as to be moved at the critical speed, i.e., for example, at the third speed, regardless of the magnitude of the vector (S37). The third speed and the critical speed refer to the highest movement speed of the character of the soccer game, and may be equal to or different from each other.

Figure 4:
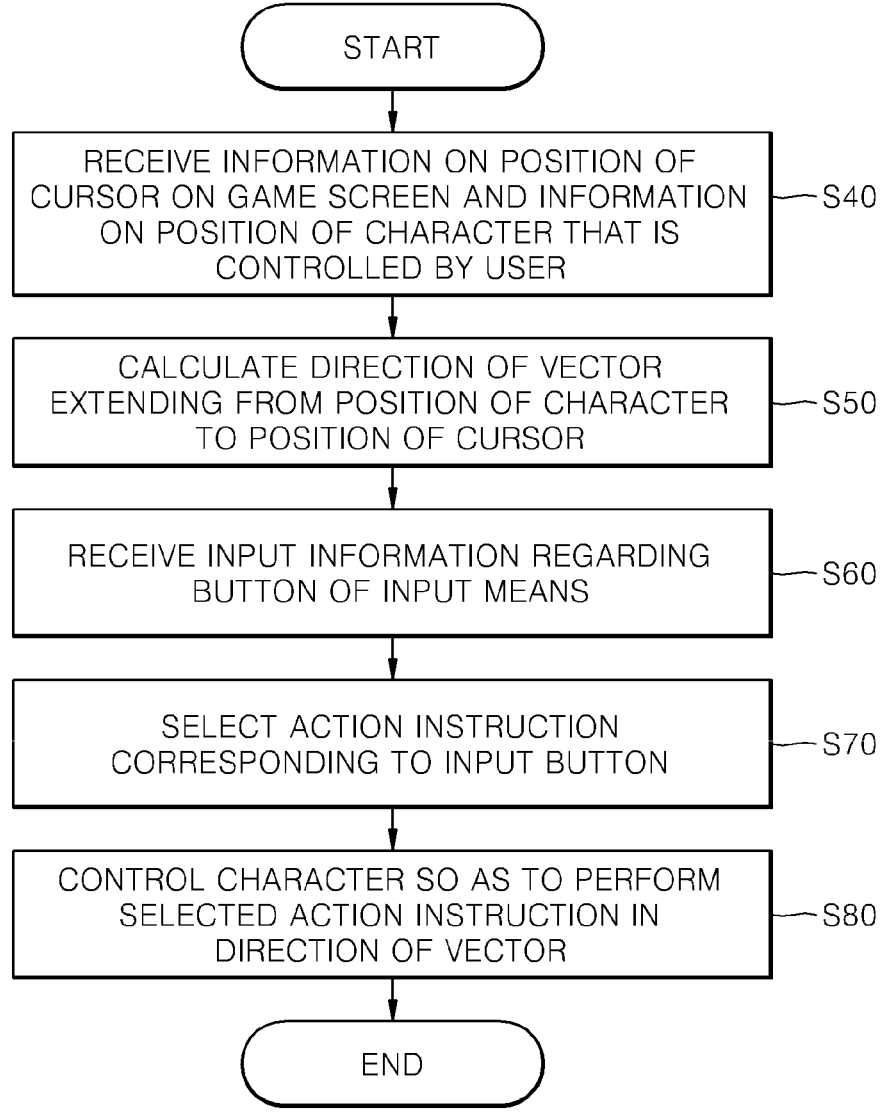
FIG. 4 is a flowchart of a method for manipulating a character of a soccer game according to another embodiment of the present invention.

FIG. 4 is a flowchart of a method for manipulating a character of a soccer game according to another embodiment of the present invention.

Referring to FIG. 4, in the method for manipulating a character of a soccer game according to another embodiment of the present invention, first, reception of cursor position information and character position information is performed (S40). In Operation S40, analyzed position information is received in the same manner as that in Operation S10 of FIG. 1.

Thereafter, the same vector as the vector of FIG. 1 is generated. Thus, in FIG. 4, the direction of the vector that extends from the position of the game character to the position of the cursor is calculated (S50).

Thereafter, the server receives input information regarding at least one input button among a plurality of input buttons included in the input means (S60). Thereafter, the server selects an action instruction matched to the corresponding input button from among action instructions that may be input via the input means (S70), and controls the game character so as to perform a corresponding action in the calculated direction of the vector in response to the selected action instruction (S80).

That is, differently from the embodiment of FIG. 1, the embodiment of FIG. 4 has a feature in that an instruction with respect to an action of the game character, is generated via the input means, such as a mouse, or the like, rather than being generated via movement of the cursor.

In this way, the user may manipulate the character so as to perform a desired action, such as a pass, a shoot, or a tackle, for example, using the position of a mouse cursor and an input button included in a mouse (for example, a left button, a right button, or a wheel).

Accordingly, the server may match at least one action instruction to the input button, and when receiving input information regarding the input button, may select an action instruction matched to the corresponding input button.

Receiving input information regarding the input button refers to receiving information regarding the input button that is sensed as being input when the user pushes the input button, i.e. when the user clicks any one input button included in a mouse.

The direction of the vector refers to a direction in which the game character performs an action. For example, a direction in which the game character kicks a ball, a direction in which the game character performs a tackle, and a direction in which the game character performs a throwing, are determined to correspond to the direction of the vector.

Figure 5:
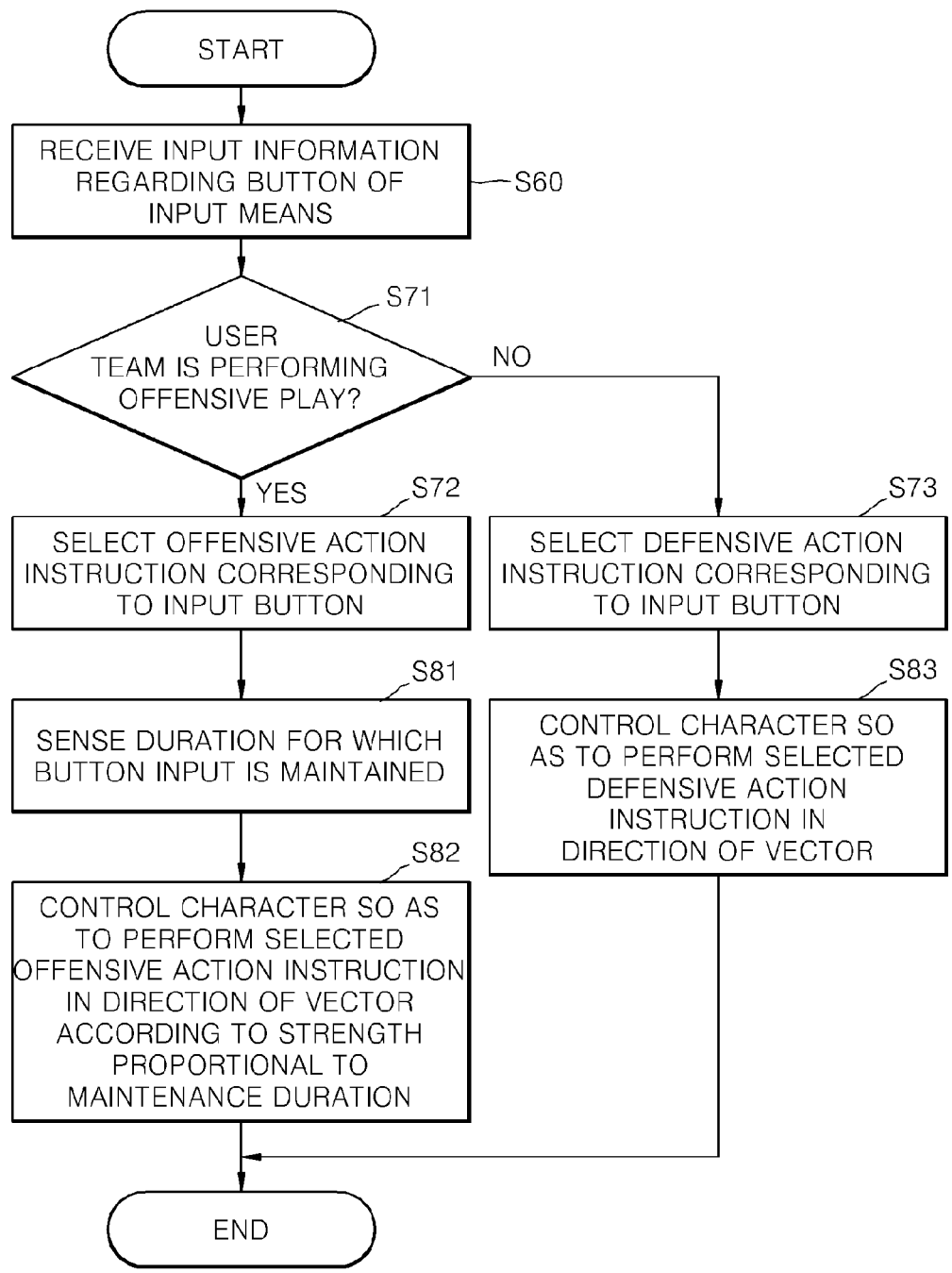
FIG. 5 is a flowchart showing control of a game character via selection of an action instruction according to another embodiment of the present invention.

FIG. 5 is a flowchart showing control of a game character via selection of an action instruction according to another embodiment of the present invention. In the following description, a repeated part of the above description with regard to FIGS. 1 to 4 will be omitted.

Referring to FIG. 5, first, the server receives input information regarding the input button (S60).

Once the input information is received, the server judges whether or not a user team is performing an offensive play or a defensive play (S71).

If it is judged that the user team is performing an offensive play, the server first selects an action instruction belonging to an offensive play from among one or more action instructions corresponding to respective input buttons (S72).

A variety of action instructions may be allotted to a single input button. For example, an action instruction belonging to an offensive play and an action instruction belonging to a defensive play may be matched to a single input button.

Accordingly, in Operation S72, the server selects an action instruction belonging to an offensive play from among various action instructions based on judgment that the offensive play is being performed.

The action instruction belonging to the offensive play involves a pass, a shoot, and the like. In this case, if the action instruction belonging to the offensive play is selected, the server receives information on a given duration, for which input of a selected input button is maintained (S81) because it is necessary to adjust the strength (speed, intensity, and height) of a desired action, such as a pass or a shoot. That is, while the user is clicking a left button of a mouse, the server may receive information on a click duration.

After Operation S81, the server sets the strength of a desired action corresponding to the selected action instruction so as to be proportional to the duration, and thereafter controls a game character so as to perform the desired action in the calculated direction of the vector according to the set strength of the action instruction in response to the selected action instruction (S82).

For example, assuming that the user performs a shoot, the server may set the strength of the shoot so as to be proportional to a duration for which the user pushes an input button corresponding to the shoot. Here, the server may set an upper limit value of the duration. Thus, the strength of the shoot may be set so as to be gradually increased in proportion to the duration within a range of the upper limit value, and may be set in such a way that the shoot is automatically performed if the duration exceeds the upper limit value. In this way, the server may realize a shoot action with the strength depending on the duration.

In this case, the duration may be divided into a plurality of sections, and a selected action, for example, an offensive action may be performed by a preset strength on a per duration section basis.

Upon implementation of the offensive action, assuming that the offensive action is a pass action and a cursor is located at another game character, it will be appreciated that a ball is passed toward the game character corresponding to the position of the cursor. In addition, if the cursor is located at any one position of a field rather than being located at another game character, of course, a ball will be passed to a spatial point (so-called a through-pass).

Likewise, such a pass action may be performed based on a critical value of the duration. For example, a short pass may be performed if the duration is less than the critical value, whereas a long pass may be performed if the duration exceeds the critical value. Moreover, the strength of the pass action may be set so as to be proportional to the duration.

On the other hand, if it is judged in Operation S71 that the user team is performing a defensive play, the server selects an action instruction belonging to the defensive play from among action instructions matched to the respective input buttons (S73), and controls the game character so as to perform a desired defensive action in the direction of the vector in response to the selected defensive action instruction (S83).

For example, if an action instruction matched to an input button is a sliding tackle, an action in which the game character performs a sliding tackle toward the cursor may be realized.

Figure 6:
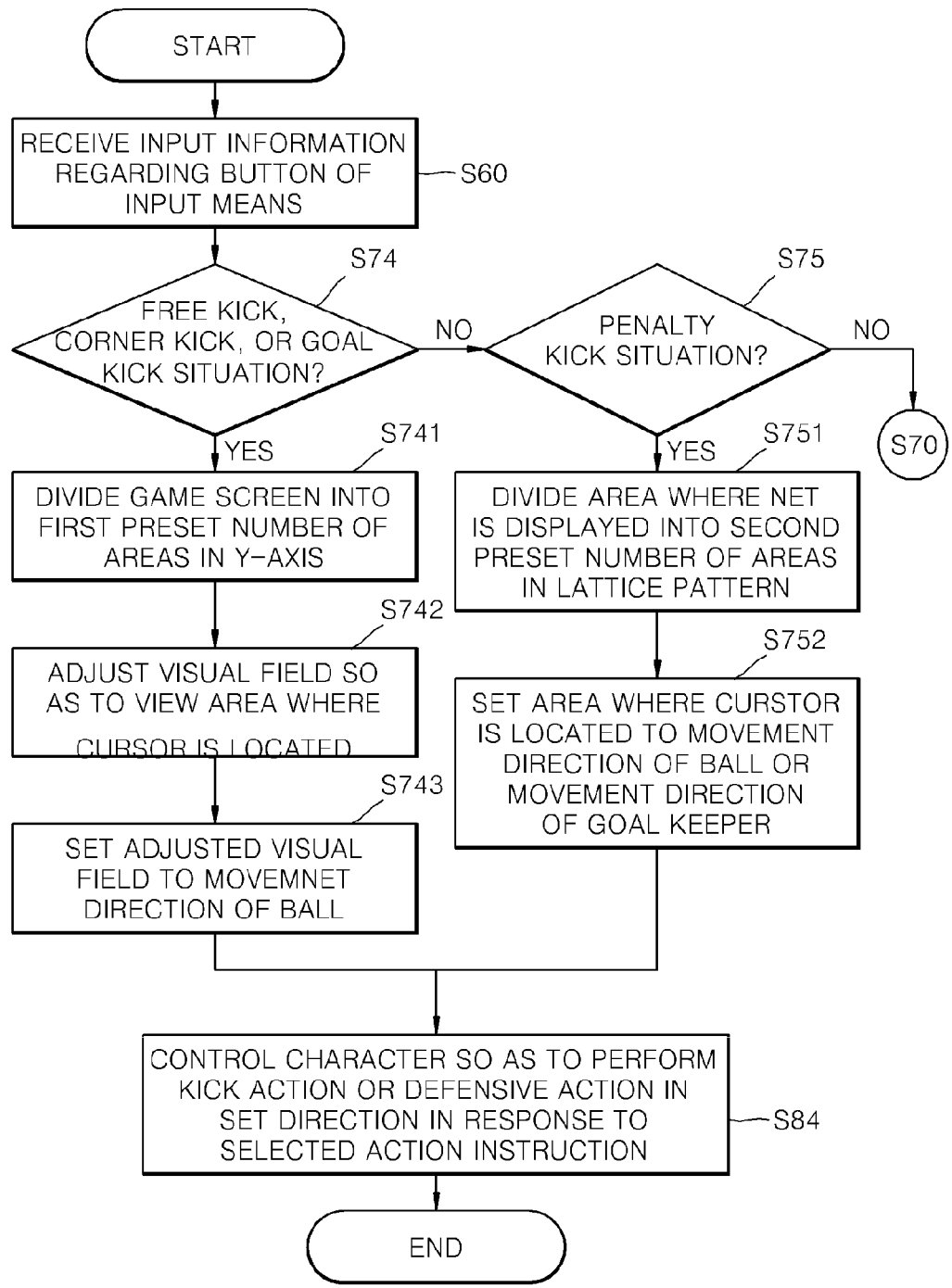
FIG. 6 is a flowchart showing control of a game character via selection of an action instruction based on a game situation according to another embodiment of the present invention.

FIG. 6 is a flowchart showing control of a game character via selection of an action instruction based on a game situation according to another embodiment of the present invention.

Referring to FIG. 6, the server, which has received the input information regarding the input button in Operation S60, judges whether or not a current game situation is a static set-play situation, rather than a dynamic situation on a field. More specifically, the server first judges whether or not a current game situation is a free kick situation, a corner kick situation, or a goal kick situation (S74).

In the case of the free kick, corner kick, or goal kick situation, for example, differently from a normal game situation in which a game play is performed from the third person point of view that views a field from the upper side, a set-play is generally performed in the first person point of view that views the field from the back of a game character that performs the set-play, more particularly, a kick.

Accordingly, in the present invention, it is necessary to manipulate the game character according to the position of the cursor in the case of the free kick, corner kick, or goal kick situation, rather than a normal game situation.

Thus, if it is judged that a current game situation is any one situation among the free kick, corner kick, and goal kick situations, a game screen is changed to a screen corresponding to the first person point of view. In this case, the server divides the game screen into a first preset number of areas (for example, three areas) in a vertical direction of the game screen, i.e., for example, in the Y-axis direction (S741).

Thereafter, the server adjusts a visual field of the game screen so as to allow the game character to view the area where the cursor is located (S742). That is, at least one of the game screen and a gaze direction of the game character is changed such that the game character views the area where the cursor is located.

Thereafter, the adjusted visual field, i.e. any one of the game screen and the gaze direction of the game character is set to a direction in which a ball, kicked by the game character, is moved, in any one situation among the free kick, corner kick, and goal kick situations (S743).

The direction in which the ball, kicked by the game character, is moved may refer to a direction in which the game character kicks the ball under the condition of the aforementioned set-play. The movement direction of the ball may be set in various ways by adjusting the first preset number of areas. Alternatively, technologies to successively adjust the movement direction of the ball according to leftward or rightward movement of the cursor without area division may also be used.

If it is judged in Operation S74 that the current game situation is not the free kick, corner kick, or goal kick situation, the server judges whether or not the current game situation is a penalty kick situation (S75). If the current game situation is not the penalty kick situation, the server returns to Operation S70 in FIG. 4. In the present invention, a throw-in situation is set such that the game character performs a throw-in to the position of the cursor. This will sufficiently be understood by the embodiment of FIG. 4, and thus a description thereof will be omitted hereinafter.

If it is judged that the current game situation is the penalty kick situation, the server divides an area where a net is displayed in the penalty kick situation into a second preset number of areas (for example, nine areas) in the form of a lattice pattern (S751). Each area may have, for example, a rectangular shape.

In this case, the server sets the area where the cursor is located among the respective areas to a destination of the vector. That is, the direction of the vector is set to a direction in which the game character kicks a penalty during an offensive play, and is set to a direction in which the goal keeper dives or moves during a defensive play (S752).

After Operation S743 and Operation S752, the server controls the game character so as to perform a kick action or a defensive action in the set direction in response to a selected action instruction (S84).

The areas divided in Operation S741 and Operation S751 may be displayed on the game screen. For example, the respective areas may be divided by dotted lines or solid lines, or may be displayed via shade and shadow.

Figure 7:
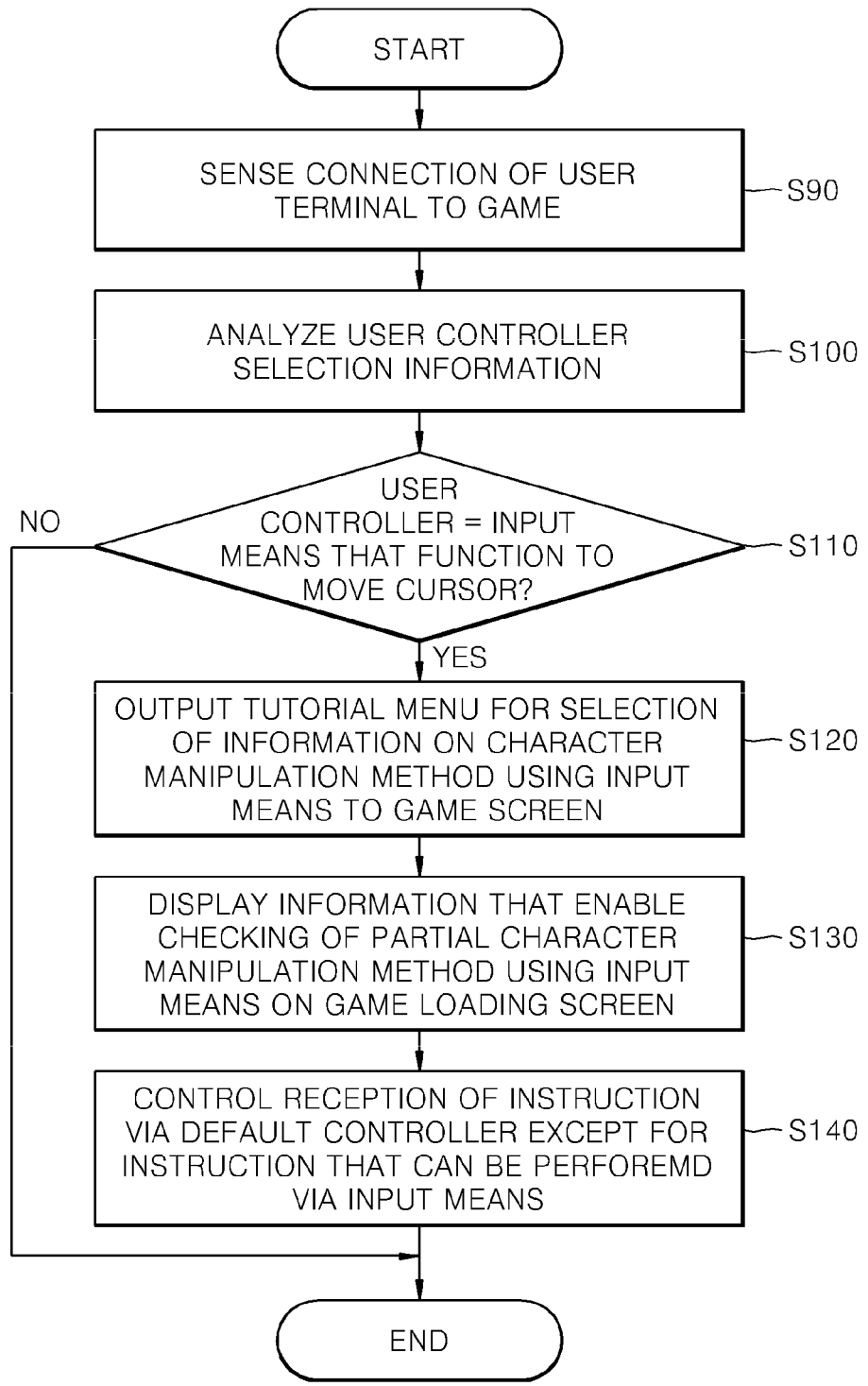
FIG. 7 is a flowchart of a method for manipulating a character of a soccer game according to another embodiment of the present invention.

FIG. 7 is a flowchart of a method for manipulating a character of a soccer game according to another embodiment of the present invention.

Referring to FIG. 7, in the method for manipulating a character of a soccer game according to another embodiment of the present invention, a soccer game server senses that a user terminal is connected to a soccer game (S90). Thereafter, the server analyzes user information, thereby analyzing user controller selection information (S100).

Here, a controller refers to the aforementioned input means. In the soccer game of the present invention, a game character may be manipulated via a variety of input means. For example, any used input means, such as a keyboard, a joystick, a joy pad, a touchscreen, a mouse, and the like, may be selected as the controller.

In this case, it is judged whether or not the user controller is the aforementioned input means of the present invention, i.e. the input means that functions to move a cursor (S110). Thereafter, if the input means that functions to move the cursor is selected as the user controller, the server transmits a tutorial menu, which is a menu for selection of information on the character manipulation method using the selected input means, to a game connection screen, i.e. a screen in which a game execution menu, a team management menu, and the like are displayed (S120).

Through transmission of the tutorial menu, the server may transmit action instructions that may be input via the input means for user confirmation. Here, the action instructions may be sorted into a movement action instruction, an offensive action instruction, a defensive action instruction, and other actions on a per game situation basis.

In addition, through transmission of the tutorial menu, data for realization of an animation scene that depicts an example of performing an action according to movement of the input means and according to an input with regard to an input button as well as character data including text information on the input method may be transmitted, which may assist the user in easily learning movement and action instructions using the input means.

The server controls a game loading screen, i.e. a standby screen for loading game content at the beginning of a game, so as to display information that assists the user in partially checking the character manipulation method using the input means (S130). In this case, movement of the input means and a selected input button as well as information on a movement or action instruction that is performed according to movement of the input means and selection of the input button may be output.

During game play, the server controls the selected input means in such a way that an instruction, which can be performed by the selected input means, is input via the input means and that an instruction, which cannot be performed via the input means, i.e. an instruction not matched to the input means, is input via a default input means that is preset by the game server (S140).

For example, an action instruction related to movement, shoot, pass, and tackle, may be input via a mouse. However, inputting a 2-to-1 pass instruction, a tactic instruction, and the like via the mouse may be complicated. Therefore, even if the user selects the mouse as the controller, the server may set, for example, a keyboard to the default input means, such that instructions that cannot be performed via the mouse may be input via the keyboard.

Figure 8:
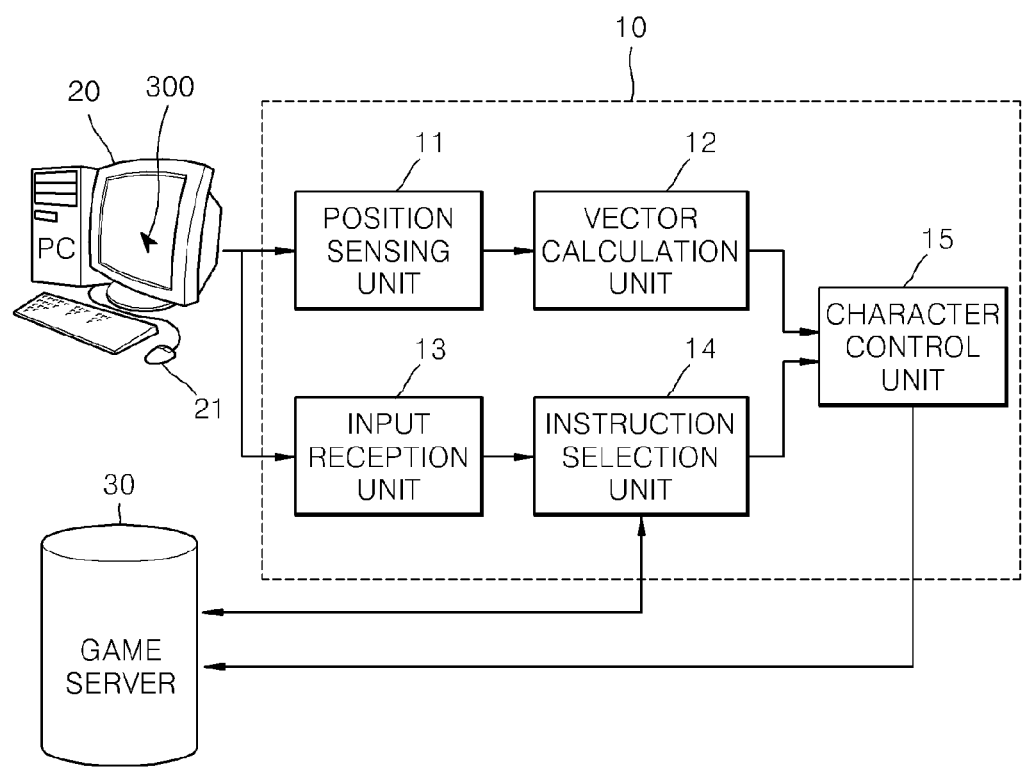
FIG. 8 is a block diagram of an apparatus for manipulating a character of a soccer game according to an embodiment of the present invention.

FIG. 8 is a block diagram of an apparatus for manipulating a character of a soccer game according to an embodiment of the present invention. In the following description, a repeated part of the above description with regard to FIGS. 1 to 7 will be omitted.

The apparatus for manipulating a character of a soccer game according to an embodiment of the present invention, designated by reference numeral 10, may include a position sensing unit 11, a vector calculation unit 12, an input reception unit 13, an instruction selection unit 14, and a character control unit 15.

First, the position sensing unit 11 receives information on a position of a cursor 300 that is moved according to movement of an input means 21 as well as information on a position of a game character from a user terminal 20 and a game server 30.

The vector calculation unit 12 generates a vector that extends from the position of the game character to the position of the cursor 300, and calculates the direction and magnitude of the vector.

In this case, the character control unit 15 functions to control the game character so as to be moved in the calculated direction of the vector according to the calculated magnitude of the vector as described above with reference to FIGS. 1 to 3 showing the sequence of controlling movement of the game character.

That is, the game character is controlled so as to be moved at first to third speeds according to the magnitude of the vector, i.e. a distance between the game character and the cursor 300, simultaneously with generation of an animation scene corresponding to each speed. In addition, if input with regard to a particular input button of the input means 21 is sensed, the game character is controlled so as to be moved at a critical speed regardless of the distance.

The input reception unit 13 receives input information regarding at least one input button among a plurality of input buttons included in the input means 21. In this case, the input reception unit 13 transmits identification information regarding the input button corresponding to the received input information to the instruction selection unit 14.

Assuming that a user team is performing an offensive play, the input reception unit 13 may also receive information on an input maintenance duration as mentioned above.

The instruction selection unit 14 selects an action instruction matched to the input button from the game server 30. In this case, the instruction selection unit 14 selects one action instruction from among a plurality of action instructions matched to a single input button according to whether a user team is performing an offensive play, a defensive play, or a particular game situation (for example, a free kick, a throw-in, a goal kick, or a penalty kick).

When receiving an action instruction from the instruction selection unit 14, the character control unit 15 receives information on the direction of the vector among the calculated vector information from the position sensing unit 11 and the vector calculation unit 12, and controls the game character so as to perform the action instruction in the direction of the vector. In this case, upon receiving information on the duration from the input reception unit 13, the character control unit 15 sets the strength of a shoot or a pass during an offensive play according to the duration information as described above with reference to FIG. 5.

The vector calculation unit 12 performs the function corresponding to FIG. 6, and may set a direction in which a ball is moved during a set play, or a direction in which a goal keeper is moved.

FIGS. 9 to 11 are views showing matching examples of an action instruction according to different embodiments of the present invention.

Referring to FIG. 9, a speed table, designated by reference numeral 100, corresponding to the above description with regard to FIG. 2 is exemplarily shown. Referring to the speed table, the magnitude of the vector sets a plurality of distance sections according to a scale changed from a distance on a game screen to a distance on a real stadium.

If the cursor is located in a section in which a distance between the cursor and the game character is 0.6 m or less, movement of the game character stops. If the cursor is located in a section in which the distance is within a range of 0.6 m to 2 m, the game character is moved at a first speed with a walking motion. If the cursor is located in a section in which the distance is within a range of 2 m to 20 m, the game character is moved at a second speed with a running motion. In addition, if the cursor is located in a section in which the distance is 20 m or more, the game character is moved at a third speed with a sprint motion.

Referring to FIG. 10, a table in which an offensive action instruction is matched to an input button of the input means (for example, a mouse), designated by reference numeral 110, is shown.

First, if an M1 button of the input means is pushed, a shoot action is performed. In this case, the strength of a shoot may be determined according to a duration, for which the M1 button is pushed.

In the case of an M2 button, an action is changed according to a duration for which the M2 button is pushed. For example, a short pass instruction is matched to the M2 button when the M2 button is pushed for a duration that is less than 0.5 seconds, and a long pass instruction is matched to the M2 button when the M2 button is pushed for 0.5 seconds or more. Of course, in the case of the long pass, the strength of the pass may be determined according to the duration for which the M2 button is pushed.

Referring to FIG. 11, a table in which a defensive action instruction is matched to an input button of the input means, designated by reference numeral 12, is exemplarily shown.

A sliding tackle instruction is matched to the M1 button of the input means, a shoulder fight instruction is matched to the M2 button, and a character selection instruction is matched to an M3 button. The defensive action instruction may be referred to when it is judged that a user team is performing a defensive play.

FIGS. 12 to 17 are views showing exemplary game screens displayed according to different embodiments of the present invention.

Figure 12:
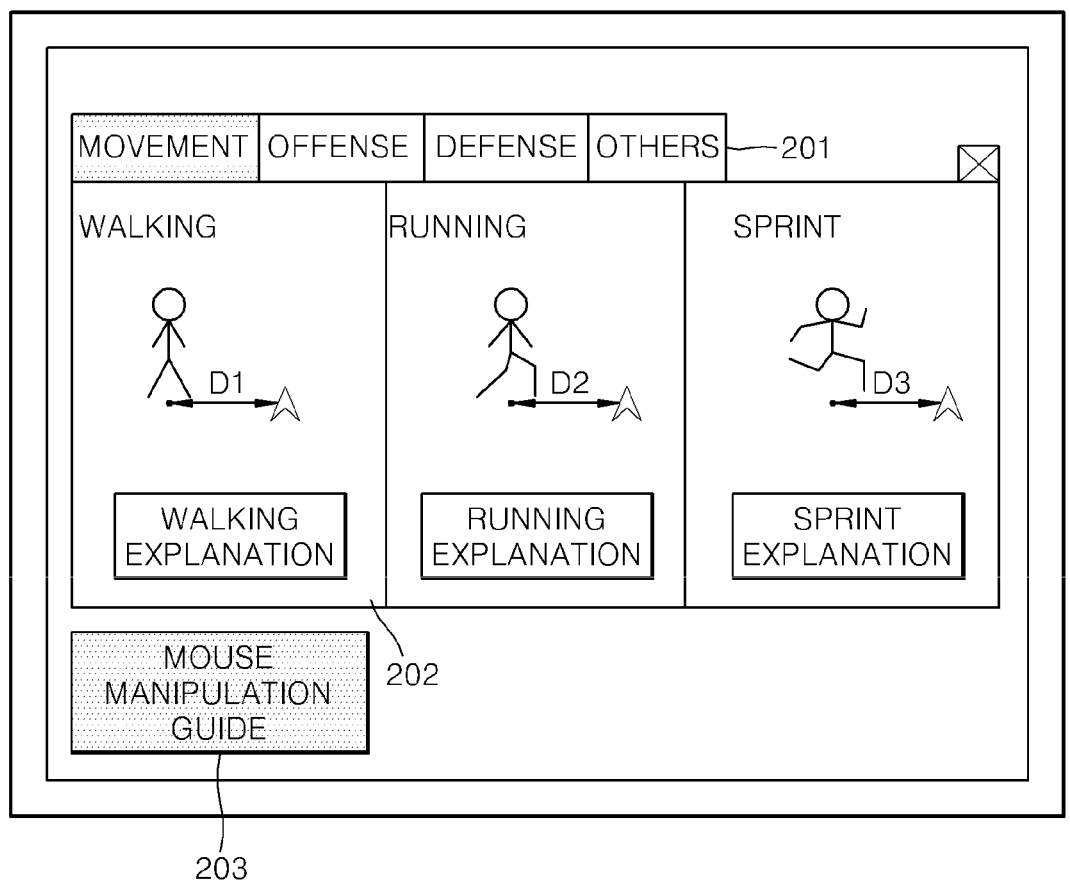
FIGS. 12 to 17 are views showing exemplary game screens displayed according to different embodiments of the present invention.

Referring to FIG. 12, a tutorial menu screen 200 may be displayed on a game screen. Through the tutorial menu screen 200, the user may check an implementation example of an action, such as a movement action, an offensive action, and a defensive action, for example, in response to each action instruction by selecting a tab menu 201.

Through each implementation screen 202, the user may check playback of an animation scene corresponding to the action instruction and explanation of the action via text information.

The tutorial menu screen 200 may enable selection and display of a guide menu 203 on the game screen.

Figure 13:
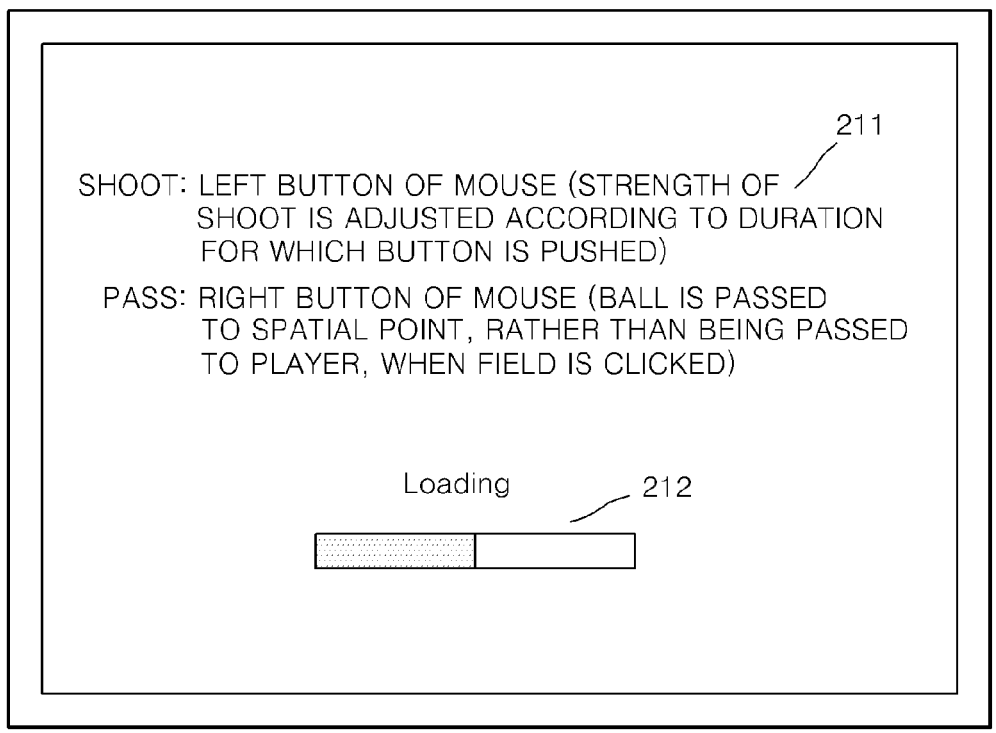

Referring to FIG. 13, a game loading screen 210 is exemplarily shown. In this case, information 211 on a method for performing an action instruction may be partially displayed. Through the game loading screen 210 on which a game loading procedure is displayed via a gauge 212, the user may check a residual time before the beginning of a game.

Figure 14:
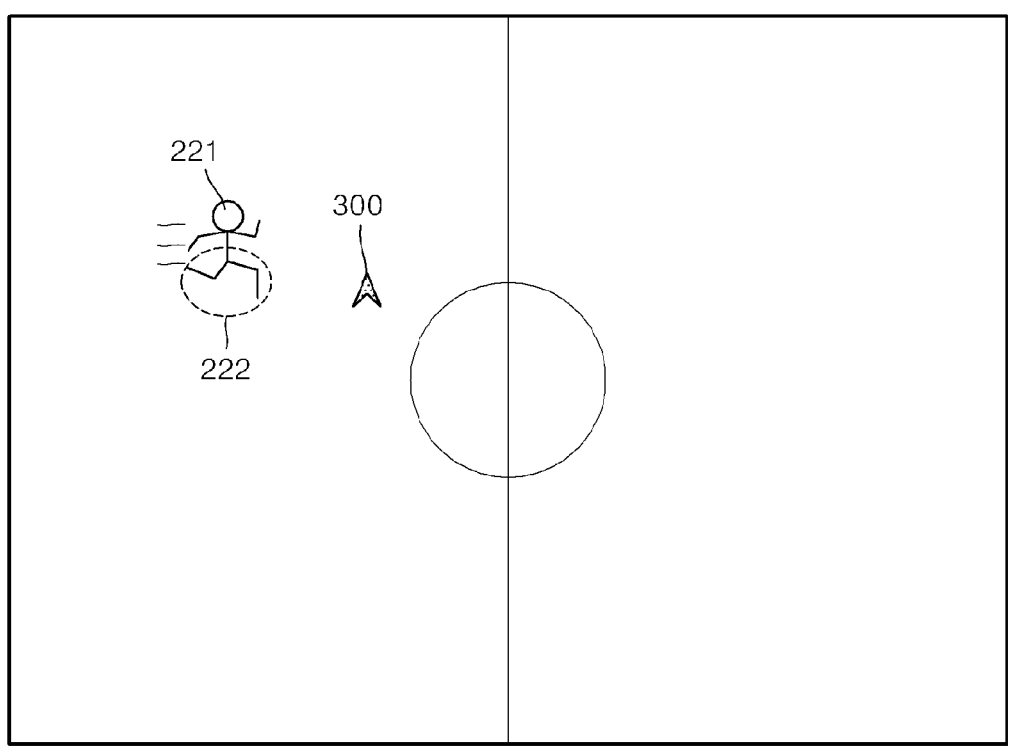

Referring to FIG. 14 showing a game screen 220, a game character 221 is exemplarily shown. The user may check, through a character selection effect region 222, that the game character 221 is controllable by the user.

The user may check movement of the cursor 300 while moving an input means. The game character 221 will be moved in a direction toward the cursor 300. In addition, a movement speed of the game character 221 may be changed according to a distance between the cursor 200 and the game character 221.

Figure 15:
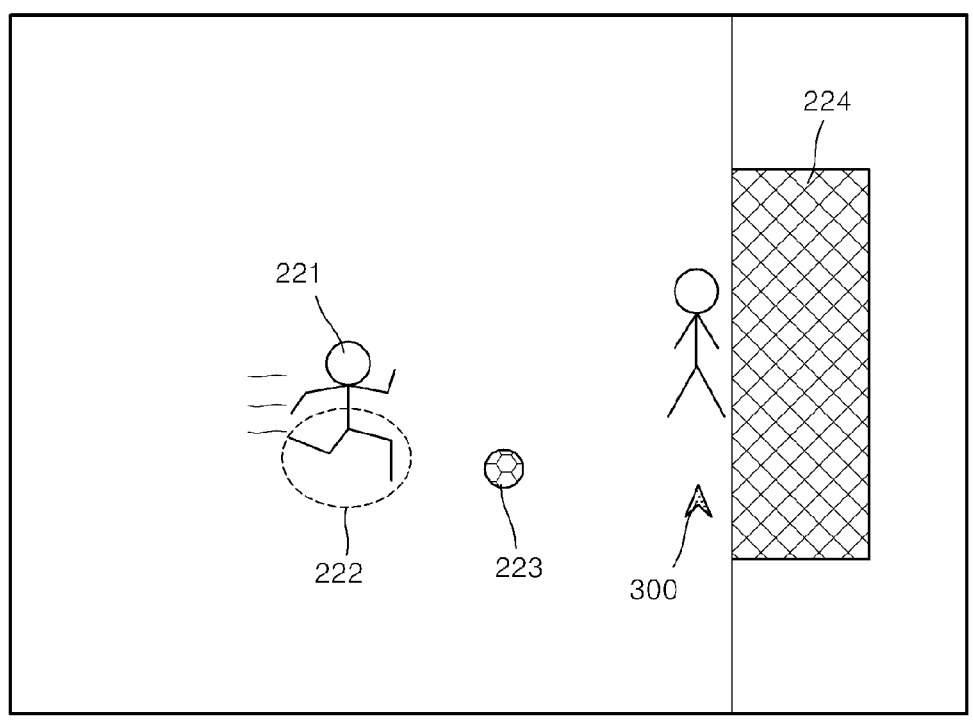

In FIG. 15, an example in which the user who is performing an offensive play on the game screen 220 shoots a ball is exemplarily shown. The ball 223 is moved in a direction from the game character 221, at which the character selection effect region 222 is marked, to the cursor 300. The user may input a shoot by pushing an input button after orienting the cursor 300 toward a net 224.

Figure 16:
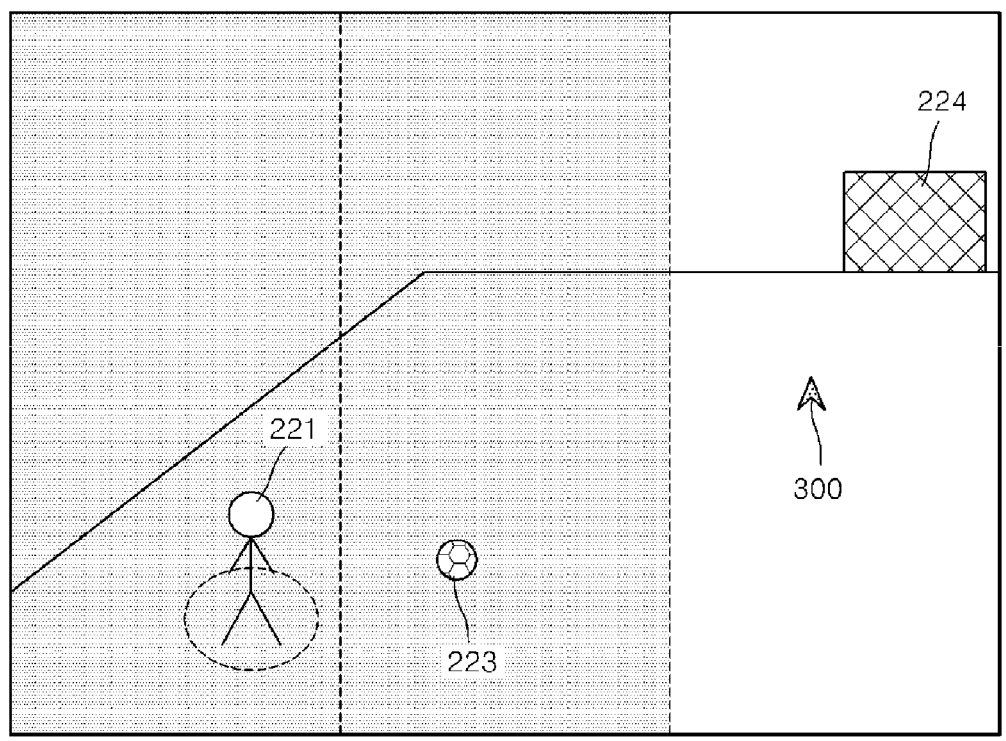

In FIG. 16, a free kick screen 230 may be checked. In this case, the free kick screen 230 is divided into three areas, and one area where the cursor 300 is located at present is shown brighter than the other areas. The user may adjust a gaze direction of the game character 221 using the cursor 300, which determines a direction in which the ball 223 travels upon implementation of a free kick.

Figure 17:
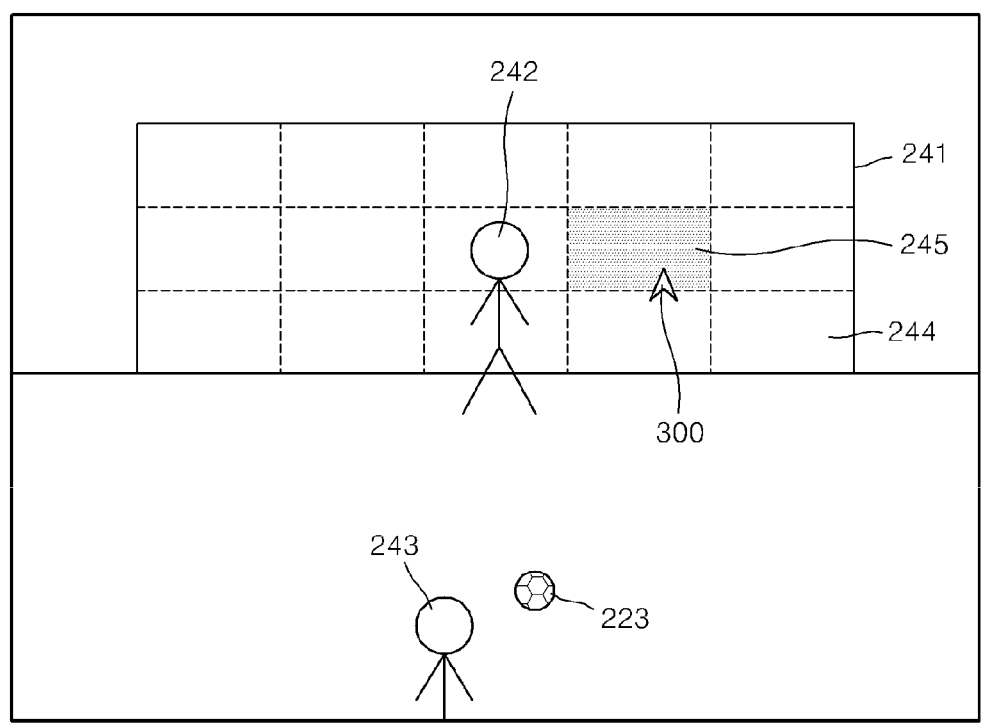

Referring to FIG. 17, a penalty kick screen 240 is exemplarily shown. In the penalty kick screen 240, a net 241 is divided into a second preset number of lattice areas 244. In this case, an area 245 where the cursor 300 is located is set to an area to which a ball 223 is moved or a goal keeper 242 is moved. Assuming that the user is performing an offensive play, the user may control the game character 243 so as to perform a penalty kick in such a way that the ball 223 is moved to the selected area 245. In addition, assuming that the user is performing a defensive play, the user may control the goal keeper 242 so as to be moved to the selected area 245. I The method for manipulating a character of a soccer game according to the embodiments of the present invention as described above may be executed by an application that is originally equipped in a terminal (the application may include a program included in, for example, a basic platform or management system equipped in the terminal), or may be executed by an application (i.e. a program) that is installed, by a user, to the terminal through an application provider server, such as a web server associated with a corresponding service or application, or an application store server. In this regard, the method for manipulating a character of a soccer game according to the above described embodiments of the present invention may be realized by the application (i.e. the program) that is originally equipped in the terminal or the application that is installed to the terminal by the user, and the method may be recorded in a recording medium that may be read by a computer, for example, a terminal.

The above described functions may be executed as the aforementioned program is recorded in a computer readable recording medium and is executed by a computer.

As described above, to execute the method for manipulating a character of a soccer game according to the respective embodiments of the present invention, the aforementioned program may include computer code, such as a C, C++, or JAVA code, machine code, etc., that may be read by a computer processor, such as a Central Processing Unit (CPU).

The code may include function code associated with, for example, a function that defines the above described functions, and may also include control code associated with an execution procedure that assists the computer processor in executing the above described functions in a predetermined fashion.

In addition, the code may further include memory reference related code with respect to additional information required for the computer processor to execute the above described functions, or with respect to information on whether media will be referred to at any position (address) of an internal or external computer memory.

In addition, if the computer processor requires communication with any other remote computers, servers, or the like in order to execute the above described functions, the code may further include communication protocol related code that designates a communication method between the computer processor and any other remote computers, servers, or the like using a computer communication module (for example, a wired and/or wireless communication module) as well as information or media for transmission/reception during communication.

A functional program to realize the present invention, and code and code segments related to the program, for example, may be easily deduced or changed by programmers of the art of the present invention in consideration of, for example, a computer system environment for reading of a recording medium and execution of a program.

The computer readable recording medium, in which the above described program is recorded, may include a ROM, a RAM, a CD-ROM, a magnetic tape, a floppy disc, or an optical media storage device, for example.

In addition, the computer readable recording medium, in which the above described program is recorded, may be distributed in a computer system that is connected to the recording medium via a network, and may store and execute code that may be read in a distributed manner by the computer. In this case, at least one computer among a plurality of distributed computers may execute some of the above proposed functions, and may transmit the execution results to at least one of the other distributed computers. Likewise, the computers that receive the execution results may execute some of the above proposed functions, and may transmit the results to the other distributed computers.

In particular, the computer readable recording medium, in which an application, i.e. a program for execution of the method for manipulating a character of a soccer game according to the respective embodiments of the present invention may be a storage medium (for example, a hard disk) included in an application provider server, such as an application store server, a web server related to an application or a corresponding service, or the like, or may be an application provider server.

The computer, which can read the recording medium, in which the application, i.e. the program for execution of the method for manipulating a character of a soccer game according to the respective embodiments of the present invention, may include a general PC, such as a general desktop or laptop computer, a smart phone, a tablet PC, a Personal Digital Assistant (PDA), and a mobile terminal such as a mobile communication terminal, and moreover, may be construed as all possible computing devices.

In addition, if the computer, which can read the recording medium, in which the application, i.e. the program for execution of the method for manipulating a character of a soccer game according to the respective embodiments of the present invention, is a smart phone, a tablet PC, a PDA, or a mobile terminal, the application may be downloaded from the application provider server into the general PC, and may be installed in the mobile terminal via a synchronization program.

Although all the constituent elements of the embodiments of the present invention have been described as being combined into one or being operated in a combined state, the present invention is not essentially limited to the embodiments. That is, all the constituent elements may be selectively combined into and operated as at least one element within the scope of the present invention. In addition, although all the constituent elements may be realized respectively as independent hardware, some or all of the constituent elements may be selectively combined and be realized as a computer program having a program module that performs some functions or all functions of one piece of hardware or a plurality of pieces of hardware. The codes and code segments constituting the computer program may be easily deduced by those skilled in the art. The embodiments of the present invention may be realized as the computer program is stored in the computer readable medium that can be read by the computer and is read and executed by the computer. The storage medium for the computer program may include a magnetic recording medium, an optical recording medium, and the like.

In the above description, the terms "comprise," "constitutes" or "have" specify the presence of stated constituent elements so long as there is no particular description to the contrary, and therefore should be construed as further including other constituent elements, rather than excluding other constituent elements. All terms including technical or scientific terms, so long as they are not differently defined, have the same meaning as generally understood by those skilled in the art. The generally used terms, such as dictionary terms, should be construed as having the same meaning as the contextual meaning of the related art, and should not be construed as having ideal meaning or excessively formal meaning so long as they are not clearly defined in the present invention.

Although the embodiments of the present invention have been disclosed for illustrative purposes, those skilled in the art will appreciate that various modifications, additions and substitutions are possible, without departing from the scope and spirit of the invention as disclosed in the accompanying claims. Accordingly, the disclosed embodiments of the present invention are given only by way of explanation, rather than limiting the technical idea of the present invention, and the technical scope of the present invention is not limited by the embodiments. The protection range of the present invention should be construed by the following claims, and all technical ideas within the equivalent range thereof should be construed as being within the scope of the present invention.

The invention claimed is:

1. A method for manipulating a character of a soccer game, the method comprising:

Receiving, by an apparatus for manipulating the character of the soccer game, information on a current position of a cursor in a game, the cursor being moved to correspond to movement of an input device on a soccer game screen, as well as information on a position of the game character that is controlled by a user via a user terminal that displays the game screen;

calculating a direction of a vector that is formed to extend from the position of the game character to the position of the displayed cursor;

receiving input information regarding at least one input button included in the input device;

selecting an action instruction matched to the input button corresponding to the input information among one or more action instructions for control of an action of the game character; and controlling the game character so as to perform an action in the calculated direction of the vector in response to the selected action instruction.

2. The method according to claim 1, wherein the selection of the action instruction includes, if a user team is performing an offensive play, selecting an action instruction belonging to the offensive play among action instructions matched to the input button corresponding to the input information.

3. The method according to claim 1, wherein the reception of the input information includes, if a user team is performing an offensive play, receiving information on a given duration for which input with respect to the input button corresponding to the input information is maintained.

4. The method according to claim 3, wherein the control of the game character includes:

setting the strength of an action corresponding to the selected action instruction so as to be proportional to the duration; and controlling the game character so as to perform the action in the calculated direction of the vector by the set strength in response to the selected action instruction.

5. The method according to claim 1, wherein the selection of the action instruction includes, if a user team is performing a defensive play, selecting an action instruction belonging to the defensive play from among action instructions matched to the input button.

6. The method according to claim 1, wherein the calculation of the direction of the vector includes:

setting a first preset number of areas by dividing the game screen in a vertical direction of the game screen if the soccer game screen is a screen with regard to any one situation among free kick, corner kick, and goal kick situations;

changing at least one of the game screen and a gaze direction of the game character such that the game character views one area where the cursor is located among the first number of areas; and setting any one of the changed game screen and the changed gaze direction of the game character to a direction in which a ball is moved from the game character in any one situation among free kick, corner kick, and goal kick situations.

7. The method according to claim 1, wherein the calculation of the direction of the vector includes:

dividing an area where an image of a net is displayed into a second preset number of areas in a lattice pattern if a user team is performing an offensive play and the soccer game screen shows a penalty kick situation; and setting one area where the cursor is located among the second number of areas to a destination to which a ball is moved in the penalty kick situation.

8. The method according to claim 1, wherein the calculation of the direction of the vector includes:

dividing an area where an image of a net is displayed into a second preset number of areas in a lattice pattern if a user team is performing a defensive play and the soccer game screen shows a penalty kick situation; and setting one area where the cursor is located among the second number of areas to a destination to which a goal keeper character is moved in the penalty kick situation.

9. A method for manipulating a character of a soccer game, the method comprising:

sensing, by a soccer game server, connection of a user terminal to the soccer game;

extracting information regarding an input device selected by a user from user information, the input device being selected from among at least one input device that can be used to manipulate the character of the soccer game;

transmitting a tutorial menu to the user terminal if the input device selected by the user is an input device that functions to move a cursor that serves as an indicator means displayed on a game screen, the tutorial menu being a menu for selection of information regarding character manipulation methods using the input device that functions to move the cursor;

controlling display of information on a game loading screen of the user terminal upon game loading, the information being information for checking at least one of the character manipulation methods using the input device that functions to move the cursor; and receiving an instruction via an input device preset in the game server during game play, except for an instruction that may be performed via the input device that functions to move the cursor.

10. The method according to claim 9, wherein the transmission of the tutorial menu includes transmitting action instructions that may be input using the input device that functions to move the cursor after sorting the action instructions into a movement action, an offensive action, a defensive action, and an action on a per game situation basis.

11. The method according to claim 9, wherein the transmission of the tutorial menu includes transmitting at least one of animation data with regard to implementation of the action instruction using the input device that functions to move the cursor, and character data including text information on an input method of the action instruction.

12. An apparatus for manipulating a character of a soccer game, the apparatus comprising:

a position sensing unit that receives information on a current position of a cursor in a game, the cursor being moved to correspond to movement of an input device on a soccer game screen, as well as information on a position of the game character that is controlled by a user via a user terminal that displays the game screen;

a vector calculation unit that calculates a direction of a vector that is formed to extend from the position of the game character to the position of the displayed cursor and a magnitude of the vector according to a distance between the position of the game character and the position of the cursor; and a character control unit that controls the game character so as to be moved in the direction of the vector at a speed corresponding to the magnitude of the vector.

13. The apparatus according to claim 12, wherein the character control unit judges whether the distance between the position of the game character and the position of the cursor corresponding to the magnitude of the vector belongs to any one section among a preset number of distance sections, and controls the game character so as to be moved at different speeds on a per distance section basis.

14. The apparatus according to claim 13, wherein the character control unit controls the game character so as to be moved at a greater speed as the distance is increased.

15. The apparatus according to claim 12, wherein, if input of a preset input button among a plurality of input buttons included in the input device is sensed, the character control unit controls the game character so as to be moved at a preset critical speed regardless of the magnitude of the vector while the input is maintained.

16. The apparatus according to claim 12, further comprising:
- an input reception unit that receives input information regarding at least one input button among the plurality of input buttons included in the input device; and
- an instruction selection unit that selects an action instruction matched to the input button corresponding to the input information among one or more action instructions for control of an action of the game character.

17. The apparatus according to claim 16, wherein the character control unit controls the game character so as to perform an action in the calculated direction of the vector in response to the selected action instruction.

18. The apparatus according to claim 16, wherein the instruction selection unit selects different action instructions, respectively belonging to an offensive play and a defensive play, according to whether a user team is performing the offensive play or the defensive play.

19. The apparatus according to claim 16, wherein the input reception unit receives information on a given duration, for which input with respect to the input button corresponding to the input information is maintained, if a user team is performing an offensive play.

20. The apparatus according to claim 19, wherein the character control unit controls the game character so as to perform the action in response to the selected action instruction by a strength that is set so as to be proportional to the duration.

* * * * *